United States Patent [19]

Pickett et al.

[11] 4,138,157

[45] Feb. 6, 1979

[54] ENERGY ABSORBING SEAT BELT WEBBING

[75] Inventors: David A. Pickett, Warren, Mich.; Steven N. Acs, Don Mills, Canada

[73] Assignee: Allied Chemical Corporation, Morris Township, Morris County, N.J.

[21] Appl. No.: 803,930

[22] Filed: Jun. 6, 1977

[51] Int. Cl.² ............................................. A62B 35/02
[52] U.S. Cl. ................................................. 297/386
[58] Field of Search ................. 280/746; 188/1 C; 244/122 B, 142, 151 R; 297/386; 2/338

[56] References Cited

U.S. PATENT DOCUMENTS

| 2,474,124 | 6/1949 | Schultz | 244/151 R |
| 3,063,058 | 11/1962 | Vollet | 2/338 |
| 3,302,973 | 2/1967 | Ravau | 297/386 |
| 3,694,028 | 9/1972 | Andres | 297/386 |
| 3,807,798 | 4/1974 | Mattson | 297/386 |
| 3,865,398 | 2/1975 | Woll | 297/386 |

FOREIGN PATENT DOCUMENTS

| 2452336 | 5/1976 | Fed. Rep. of Germany | 297/386 |
| 1105648 | 3/1968 | United Kingdom | 244/122 B |

Primary Examiner—James T. McCall
Attorney, Agent, or Firm—Roger H. Criss; Patrick L. Henry

[57] ABSTRACT

Energy absorbing seat belt restraint comprising a thin, flexible elongated element having a length substantially greater than its width and adapted for securing a wearer in a vehicle, the element being provided with at least one integral discontinuity along its length, whereby said element is capable of absorbing kinetic energy imparted thereto by movement of the wearer thereagainst.

13 Claims, 4 Drawing Figures

ENERGY ABSORBING SEAT BELT WEBBING

BACKGROUND OF THE INVENTION

1. Field of the Invention

This invention relates to energy absorbing seat belt systems, such as automotive seat belt webbing.

2. Description of the Prior Art

Heretofore, various concepts and designs have been proposed to provide or improve upon the energy absorbing capability of seat belt webbing, such as webbing utlized in a vehicle restraint system. Such webbing typically is formed from nylon or polyester fabric and usually is stored in a rolled up configuration on a seat belt retractor. Although the seat belt webbing per se is somewhat extensible and hence is capable to a limited degree of absorbing energy resulting from movement of the wearer against the seat belt such as occurs in a collision, in some cases increased energy absorption is desirable. For example, in smaller vehicles it would be especially desirable to utilize an energy absorbing system due to the compactness of the vehicle interior. Among the various devices which have been proposed for providing an energy absorbing characteristic to the seat belt assembly are those described in U.S. Pat. Nos. 3,550,957, 3,409,327 and 3,446,533 all to Radke, et al. However, such designs either involve relatively expensive equipment or are bulky and hence are difficult to wind up, or both. It would be desirable if a simplified, relatively inexpensive and non-bulky energy absorbing seat belt webbing system were provided.

SUMMARY OF THE INVENTION

In accordance with this invention there is provided an energy absorbing seat belt restraint comprising a thin, flexible elongated element having a length substantially greater than its width and adapted for securing a wearer in a vehicle, the element being provided with at least one integral discontinuity along its length, whereby said element is capable of absorbing kinetic energy imparted thereto by movement of the wearer thereagainst. It has been found that by providing at least one such discontinuity in the seat belt element, the energy absorbing capability of the element is vastly increased. Such discontinuity may be in various forms, such as slits, perforations or other configurations provided in seat belt webbing, for example, and located at the edges or in the central portion of the webbing. The discontinuities may extend in longitudinal, transverse or angular directions, or combinations thereof, and may be formed in the element itself or may be formed in a similar element which is affixed to the restraining element in the manner of a patch, for instance. More specific details of the present invention are described hereinbelow.

DESCRIPTION OF THE PREFERRED EMBODIMENT

Figure 1:
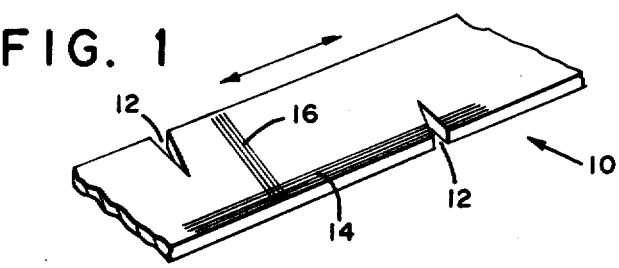
FIG. 1 is a view of one embodiment of the seat belt restraint of this invention wherein the discontinuities are provided on the element itself.

In accordance with this invention, a flexible seat belt restraint element, preferably in the form of conventional seat belt webbing, is provided with at least one integral discontinuity along its length so as to provide a kinetic energy absorbing structure. With reference to FIG. 1, a portion of a flexible seat belt restraint element 10 is depicted in the form of seat belt webbing. As is conventional, the webbing is formed from a plurality of warp yarns 14 and weft yarns 16, which yarns may be formed from any suitable fiber, such as polyester, nylon and the like. Provided along each edge of webbing 10 is an integral discontinuity 12 shown in the form of slits extending through webbing 10 from the edge towards the center of the webbing. Such slits provide integral discontinuities in some of the warp yarns 14. By the term "integral" discontinuities, it is meant that the discontinuous structure is imparted in some manner to the length of the webbing as opposed to the natural interstices formed as a result of the weaving or other textile process, the size of which depends upon the compactness of the weave.

Figure 2:
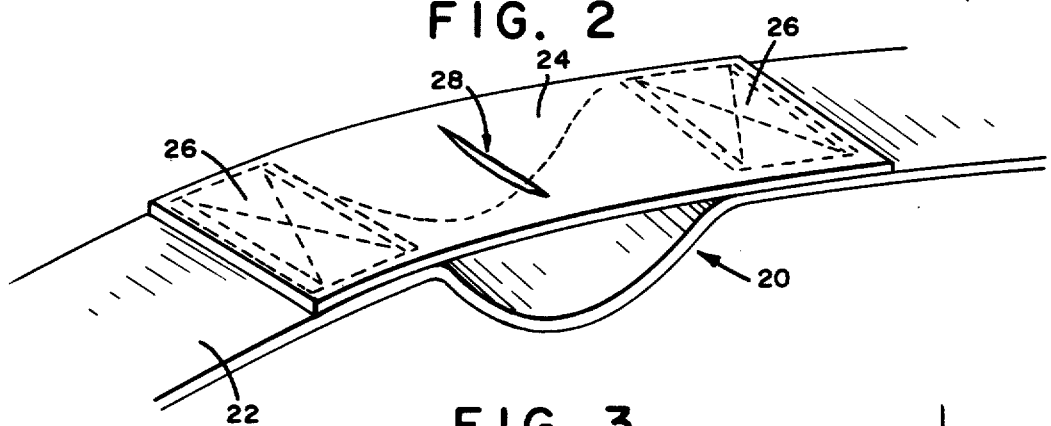
FIG. 2 is a view of another embodiment of the device of this invention wherein the discontinuities are provided on a member secured to the flexible element.

Slits 12 may be provided in any suitable manner in webbing 10, such as by any cutting, punching or similar operation. Preferably, in order to eliminate frayed ends, the slits are formed in a manner which fuses the yarn or fiber ends. For example, a hot knife employed in cutting seat belt webbing to desired lengths may be used to form the slits or other discontinuities. Although discontinuities 12 are depicted in FIG. 1 as being in the form of slits, they may be provided in the webbing in any suitable form such as oval shape, circular shape, etc. Furthermore, the discontinuities, which are shown in FIG. 1 as extending in the transverse direction from the edge, may be provided in any suitable location along the length and width of the webbing, such as for example, in the central portion of the webbing as shown in FIG. 2. Also, the discontinuities may extend in any direction with respect to the width of the webbing, such as, for example, parallel, perpendicular or at an intermediate angle thereto. What is necessary for purposes of this invention is that such discontinuities extend along at least a portion of the length of the webbing. In addition, only a single discontinuity may be provided or edge discontinuities may be provided on the same or opposite edges or central discontinuities may be provided.

As indicated above, the discontinuities may be provided in the integral element itself or on a separate element which is attached thereto. The latter embodiment is shown in FIG. 2 wherein a restraint system 20 comprises seat belt webbing 22 which is provided with a section of another flexible element 24, such as in the form of a patch of seat belt webbing, which is secured to the restraint member in any suitable manner such as by means of stitching 26 as depicted. The patch 24 is provided with a discontinuity shown in the form of a central slit 28. Preferably, the patch and the restraint element are seamed together to provide a slightly bowed portion in one of the elements for greater energy absorption. The total system, however, is relatively compact and is suitable for storage on conventional seat belt retractors.

It will be appreciated by those skilled in the art that the location, extent and number of discontinuities are dependent upon the desired energy absorbing characteristics which are required for restraint of a specific seat belt assembly system. That is to say, depending upon the configuration of the system and vehicle interior, various design criteria are fixed which define the extent of webbing elongation is permissible over a maximum amount of energy imparted to the webbing. For example, in a compact or subcompact vehicle, extensions of seat belt webbing in the order of, for example, about 4 to 8 inches may be desired at a minimum force of, for example, 1500 to 2500 pounds. Seat belt webbing in accordance with this invention have been capable of meeting such criteria by, for example, providing slits of about one-half inch in width in a conventional 2 inch wide polyester seat belt webbing with the slits extending from opposite edges of the webbing and spaced apart along the extent of the webbing at distances ranging from about 1 to 8 inches, for example. Obviously, other design criteria can be achieved by varying the location, direction, size and shape of the discontinuities.

Figure 4:
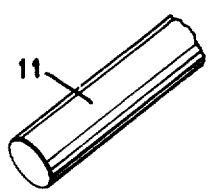
FIG. 4 is a partial view of an inflatable seat belt restraint.

The restraint element of this invention may be utilized in any desired seat belt system. Preferably, the energy absorbing feature is provided on a shoulder harness since that portion of an occupant restraint system usually is under the most stress in a collision. Alternatively, the energy absorber may be provided in the lap belt or in both the lap and shoulder belts. The specific location of the energy absorber along the extent of the webbing is likewise a design feature dependent upon the specific restraint system. For example, the energy absorber may be located on the shoulder belt behind the plane of the wearer and preferably adjacent to an anchor point or a pivoting member such as a D-ring. Also, the present invention may be employed with various occupant restraint systems, such as those of the inflatable band type as is shown, for example, in U.S. Pat. No. 3,841,654 to Lewis. An inflatable belt 11 is shown in FIG. 4.

Figure 3:
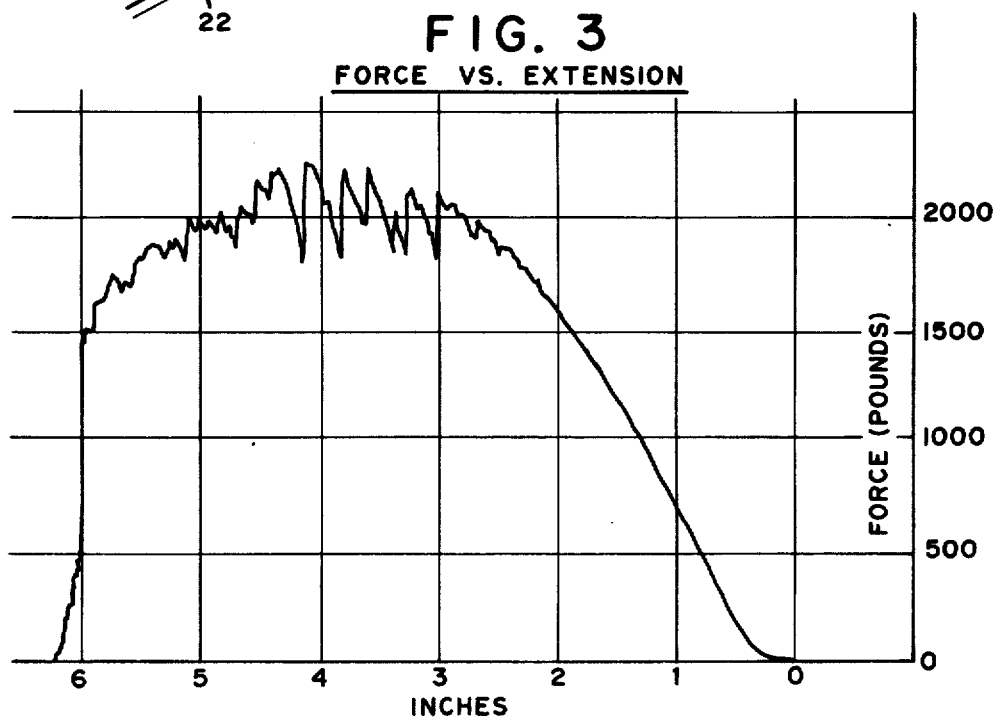
FIG. 3 is a graph of force versus extension of a typical device of this invention when tested under load.

With respect to FIG. 3, this graph illustrates a typical force-extension curve of the energy absorbing webbing of this invention. Such a curve, which represents extension of webbing in the direction of the arrow of FIG. 1, is made on an Instron testing machine wherein two jaws secure the webbing and extend the webbing in opposite directions. In this figure, conventional polyester seat belt webbing of 2 inch width was utilized with two slits extending across the width of the webbing for about one-half inches each and from opposite edges of the webbing. The slits were spaced approximately 4 inches apart along the length of the webbing and were formed by a hot knife. The jaws were separated at a speed of 5 inches per minute and the chart speed was synchronized to the separation speed. As can be seen, the webbing of this invention provided an extension of about 2 to 5 inches at 2000 pounds of force or absorbed about 300 to 800 foot-pounds of energy.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

We claim:

1. An energy absorbing seat belt restraint comprising seat belt webbing adapted for securing a wearer in a vehicle, said webbing being formed from warp and weft yarns, and at least one integral discontinuity in said warp yarns along the length of said webbing, whereby said webbing is capable of absorbing kinetic energy imparted thereto by movement of said wearer thereagainst, said restraint being in a form adapted for storage on a seat belt retractor.

2. The restraint of claim 1 wherein said yarns are formed of polyester or nylon fibers.

3. The restraint of claim 2 wherein said discontinuity is in the form of a slit.

4. The restraint of claim 3 wherein said slit extends from an edge of said webbing towards the central portion thereof.

5. The restraint of claim 4 wherein a plurality of slits are provided.

6. The restraint of claim 5 wherein said slits are provided on opposite edges of said webbing.

7. The restraint of claim 3 wherein said slit is provided in a central portion of said webbing.

8. The restraint of claim 3 wherein said slit is provided on a separate webbing element which is attached to said restraint.

9. The restraint of claim 8 wherein said separate element is attached to said restraint by means of stitching.

10. The restraint of claim 3 wherein said slit is formed with a fusing of the adjacent yarn ends.

11. The restraint of claim 1 wherein said discontinuity is provided on the restraint itself.

12. The restraint of claim 1 wherein said discontinuity is provided on seat belt webbing.

13. The restraint of claim 1 wherein said restraint is inflatable.

* * * * *